(12) United States Patent
Radican

(10) Patent No.: US 6,560,508 B1
(45) Date of Patent: May 6, 2003

(54) STANDARD PARTS METERING SYSTEM

(76) Inventor: Joseph E. Radican, 4 Windsor Ct., Rocky River, OH (US) 44116

( * ) Notice: Subject to any disclaimer, the term of this patent is extended or adjusted under 35 U.S.C. 154(b) by 60 days.

(21) Appl. No.: 09/703,117

(22) Filed: Oct. 31, 2000

(51) Int. Cl.⁷ .................................................. G06F 7/00
(52) U.S. Cl. .......................... 700/214; 700/215; 700/99
(58) Field of Search ................................. 700/213, 214, 700/216, 215, 219, 221, 222, 226, 99; 705/28, 29; 235/385; 198/349, 350, 399.7

(56) References Cited

U.S. PATENT DOCUMENTS

| | | | | | |
|---|---|---|---|---|---|
| 3,889,797 | A | * | 6/1975 | Naito et al. ............... | 198/346.1 |
| 5,109,973 | A | * | 5/1992 | Hirano et al. .......... | 198/341.03 |
| 5,712,789 | A | * | 1/1998 | Radican ...................... | 700/226 |
| 5,953,234 | A | * | 9/1999 | Singer et al. ............ | 414/789.6 |
| 6,028,532 | A | * | 2/2000 | Tsurumoto et al. ......... | 198/349 |
| 6,148,291 | A | * | 11/2000 | Radican ....................... | 705/22 |
| 6,275,743 | B1 | * | 8/2001 | Kondo et al. ............... | 700/116 |
| 6,317,082 | B1 | * | 11/2001 | Bacon et al. ............... | 235/385 |

* cited by examiner

Primary Examiner—Khoi H. Tran
(74) Attorney, Agent, or Firm—Arter & Hadden LLP

(57) ABSTRACT

A system and method for collecting, inventorying, stocking and performing metered delivery of standard parts to an assembly operation. Standard parts are collected from multiple suppliers in an optimized pick-up route, and delivered to a standard parts metering warehouse. The standard parts are broken down into production shift quantities based upon production data of the assembly operation. The production shift quantities of standard parts are labeled according to part type or identity and a drop zone within the assembly operation. The standard parts are then stocked in the metering warehouse according to an optimized route which corresponds to a drop zone delivery sequence in the assembly operation. Limited production shift quantities of standard parts are then metered from the metering warehouse in accordance with a production schedule of the assembly operation, and delivered directly to pedestals at workstations at the corresponding drop zones in the assembly operation.

7 Claims, 13 Drawing Sheets

| ROUTES | EE 46 | CC 45 | DD 37 | BB 29 | BB 33 | G 24 | F 23 | CC 16 | D 15 |
|---|---|---|---|---|---|---|---|---|---|
| #1 | J49 | J48 | J47 | J46 | G45 | K44 | D44 | F43 | |
| #2 | M49 | M46 | M44 | M40 | M38 | M27 | M24 | F32 | C31 |
| #3 | E42 | B42 | D41 | G39 | F38 | E37 | H36 | G35 | |
| #4 | N37 | N34 | | | | | | | |
| #5 | | | | | | | | | |

Fig.3

STANDARD PARTS COVER SHEET

| 51 | 52 | 53 | 54 | 55 | 56 | 57 |
|---|---|---|---|---|---|---|
| part | dropzone | mif | notes | optionpart | pcs/option | daily |
| 370443 S32 | F43 | 1 | 1/6cyl AUTO | 97BB 6P095 BD | 1 | 237 |
| 370443 S32 | F43 | 1 | 2/AUTO | 93BT 7C107 AA | 2 | 1630 |
| 388930 S | F38 | 3 | 6 PER | ALLcar | 6 | 5280 |
| 388930 S | G7 | 3 |  | ALLcar | 2 | 1760 |
| 389114 S | D41 | 4 | 1/non-ABS | 97BB 2263 CA | 1 | 386 |
| 389114 S | E37 | 4 | 1 PER | ALLcar | 1 | 880 |
| 389114 S | N37 | 4 | 2 PER TRUNK HOLES | ALLcar | 2 | 1760 |
| 389114 S | TKBD | 4 | 2 PER | ALLtrk | 2 | 2080 |
| 390964 S | D15 | 2 | 8 PER ROCKER MOLDING (12/16) | 94BB 10182 BA | 4 | 1328 |
| 390964 S | M44 | 2 | 12 PER SPLASH SHIELD | ALLcar | 12 | 10560 |
| 56910 S58 | G35 | 1 | 2 PER | ALLcar | 2 | 1760 |
| E826292 S | E37 | 1 | 2 PER | ALLcar | 2 | 1760 |
| N605805 S309 | J46 | 2 | 1 SVT (SHOWS SCRAP) | F8NV 1007 BA | 1 | 25 |
| N605805 S309 | M46 | 2 | 1 PER SVT (SHOWS SCRAP) | F8NV 1007 BA | 1 | 25 |
| N605905 S309 | J04 | 2 | 4 PER | ALLtrk | 4 | 4160 |
| N605905 S309 | M49 | 2 | 1 PER | ALLcar | 1 | 880 |
| N800750 S51 | F43 | 1 | 4 PER | ALLcar | 4 | 3520 |
| N801395 S | D41 | 1 | 1 PER | ALLcar | 1 | 880 |
| N802331 S301 | M40 | 1 | 3/Arab | N802331 S301 | 1 | 0 |
| N802538 S301 | N37 | 1 | 4/MERC FOG 2/FORD FOG | N802538 S301 | 1 | 856 |
| N803946 S | D15 | 1 | 10 PER Rocker Molding (12/16) | 94BB 10182 BA | 5 | 1660 |
| N805227 S | D44 | 1 | 2 PER | ALLcar | 2 | 1760 |
| N805320 S309 | D03 | 3 | 1 PER | ALLtrk | 1 | 1040 |
| N805320 S309 | F43 | 3 | 1 PER | ALLcar | 1 | 880 |
| N805347 S2 | BB33 | 1 | 6 PER | ALLcar | 6 | 5280 |
| N806913 S | F43 | 1 | 1 per | ALLcar | 1 | 880 |
| N808248 S190 | F38 | 3 | 3 PER | ALLcar | 3 | 2640 |
| N808248 S190 | TKBD | 3 | 3 PER | ALLtrk | 3 | 3120 |
| N808322 S301 | N37 | 1 | 2 PER | ALLcar | 2 | 1760 |
| N811836 S309 | M46 | 1 | 3 PER | ALLcar | 3 | 2640 |
| N811837 S309 | F23 | 1 | 12 PER | ALLcar | 12 | 10560 |
| PM W505225 S309M | M27 | 1 | 2/4cyl | 97BB 9600 DD | 2 | 1186 |
| W500004 S309 | G35 | 2 | 1 PER | ALLcar | 1 | 880 |

FIG. 5

Standard Parts
Multiple Line Feed
Replenishment Matrix

| | A | B | C | D | E | F | G | H |
|---|---|---|---|---|---|---|---|---|
| | Drop Zone I.D. | Line Feed I.D. | Part Number | Vehicle Type (9270 Item) | Per Unit Pull | X Ref Part # | Daily Production Schedule | Shift Production Schedule |
| 1 | | | | | | | L3 | G/2 |
| 2 | | | | | | | | |
| 3 | | | | | | | | |
| 4 | P-B42 | | W500013 S309 | All | 1 | ? | 880 | 440 |
| 5 | P-D41 | | W500013 S309 | All | 3 | ? | 880 | 440 |
| 6 | P-F43 | | W500013 S309 | 6 Cyl | 4 | 97BW 19D850 EE | 880 | 440 |
| 7 | P-F43 | | W50013 S309 | 6 Cyl Auto | 2 | 97BB 6P095 BD | 365 | 182 |
| 8 | P-F43 | | W500013 S309 | 6 Cyl Stnd | 1 | 95BB 9B929 CA | 200 | 100 |
| 9 | | | | | | | | |
| 10 | P-J46 | | W500022 S309 | 4 Cyl | 2 | 97BB 9600 DD | 650 | 325 |
| 11 | P-K44 | | W500022 S309 | 6 Cyl | 1 | 97BB 5G232 AC | 250 | 125 |
| 12 | P-K44 | | W500022 S309 | 4 Cyl Auto | 1 | ? | 880 | 440 |
| 13 | P-K44 | | W500022 S309 | 4 Cyl | 4 | ? | 880 | 440 |
| 14 | P-M40 | | W500022 S309 | ? | 2 | ? | 880 | 440 |
| 15 | | | | | | | | |
| 16 | P-H36 | | W500023 S309 | All | 2 | ? | 880 | 440 |
| 17 | P-J46 | | W500023 S309 | All Auto | 2 | 93BT 7C107 AA | 670 | 335 |
| 18 | P-J46 | | W500023 S309 | 6 Cyl Auto | 1 | 97BB 6P095 BD | 345 | 172 |
| 19 | | | | | | | | |
| 20 | P-J46 | | W500101 S309 | All | 2 | 98BG 2C214 AD | 880 | 440 |
| 21 | P-J49 | | W500101 S309 | All | 2 | 98BG 2C214 AD | 880 | 440 |
| 22 | | | | | | | | |
| 23 | P-BB29 | | W520200 S309 | All | 8 | ? | 880 | 440 |
| 24 | P-F43 | | W520200 S309 | 6 Cyl | 2 | 96BB 3691 AC | 250 | 125 |

FIG. 6

Standard Parts
Multiple Line Feed
Replenishment Matrix

| | I | J | K | L | M | N | O | P | Q |
|---|---|---|---|---|---|---|---|---|---|
| 1 | Shift Usage Req't | Add Predictable Adjustment (%) | Minimum Pack Qty | Monday AM BOH | Monday AM Safety Stock @ end of Shift | Monday AM Order Qty | Monday PM BOH | Monday PM Safety Stock @ end of Shift | Monday PM Order Qty |
| 2 | E*H | (I*0%)+1 | | from Fri PM | L-J | for Mon PM | (N*K)+M | O-J | for Tues AM |
| 3 | | | | | | | | | |
| 4 | 440 | 440 | 2500 | 2500 | 2060 | 0 | 2060 | 1620 | 0 |
| 5 | 1320 | 1320 | 2500 | 2500 | 1180 | 1 | 3680 | 2360 | 0 |
| 6 | 1760 | 1760 | 2500 | 2500 | 740 | 1 | 3240 | 1480 | 1 |
| 7 | 364 | 364 | 2500 | 2500 | 2136 | 0 | 2136 | 1772 | 0 |
| 8 | 100 | 100 | 2500 | 2500 | 2400 | 0 | 2400 | 2300 | 0 |
| 9 | | | | | | | | | |
| 10 | 650 | 650 | 1500 | 1500 | 850 | 0 | 850 | 200 | 1 |
| 11 | 125 | 125 | 1500 | 1500 | 1375 | 0 | 1375 | 1250 | 0 |
| 12 | 440 | 440 | 1500 | 1500 | 1060 | 0 | 1060 | 620 | 0 |
| 13 | 1760 | 1760 | 1500 | 3000 | 1240 | 2 | 4240 | 2480 | 0 |
| 14 | 880 | 880 | 1500 | 1500 | 620 | 1 | 2120 | 1240 | 0 |
| 15 | | | | | | | | | |
| 16 | 880 | 880 | 1400 | 1400 | 520 | 1 | 1920 | 1040 | 1 |
| 17 | 670 | 670 | 1400 | 1400 | 730 | 1 | 2130 | 1460 | 0 |
| 18 | 172 | 172 | 1400 | 1400 | 1228 | 0 | 1228 | 1056 | 0 |
| 19 | | | | | | | | | |
| 20 | 880 | 880 | 1800 | 1800 | 920 | 1 | 2720 | 1840 | 0 |
| 21 | 880 | 880 | 1800 | 1800 | 920 | 1 | 2720 | 1840 | 0 |
| 22 | | | | | | | | | |
| 23 | 3520 | 3520 | 7500 | 7500 | 3980 | 1 | 11480 | 7960 | 0 |
| 24 | 250 | 250 | 7500 | 7500 | 7250 | 0 | 7250 | 7000 | 0 |

FIG. 6A

Standard Parts
Multiple Line Feed
Replenishment Matrix

| | R | S | T | U | V | W | X | Y |
|---|---|---|---|---|---|---|---|---|
| | Tuesday AM BOH | Tuesday AM Safety Stock @ end of Shift | Tuesday AM Order Qty for Tues PM | Tuesday AM BOH | Tuesday PM Safety Stock @ end of Shift | Tuesday PM Order Qty for Wed AM | Wednesday AM BOH | Wednesday AM Safety Stock @ end of Shift |
| 1 | | | | | | | | |
| 2 | | | | | | | | |
| 3 | | | | | | | | |
| 4 | 1620 | 1180 | 0 | 1180 | 740 | 0 | 740 | 300 |
| 5 | 2360 | 1040 | 1 | 3540 | 2220 | 0 | 2220 | 900 |
| 6 | 3980 | 2220 | 0 | 2220 | 460 | 1 | 2960 | 1200 |
| 7 | 1772 | 1408 | 0 | 1408 | 1044 | 0 | 1044 | 680 |
| 8 | 2300 | 2200 | 0 | 2200 | 2100 | 0 | 2100 | 2000 |
| 9 | | | | | | | | |
| 10 | 1700 | 1050 | 0 | 1050 | 400 | 1 | 1900 | 1250 |
| 11 | 1250 | 1125 | 0 | 1125 | 1000 | 0 | 1000 | 875 |
| 12 | 620 | 180 | 1 | 1680 | 1240 | 0 | 1240 | 800 |
| 13 | 2480 | 720 | 2 | 3720 | 1960 | 2 | 4960 | 3200 |
| 14 | 1240 | 360 | 1 | 1860 | 980 | 1 | 2480 | 1600 |
| 15 | | | | | | | | |
| 16 | 2440 | 1560 | 0 | 1560 | 680 | 1 | 2080 | 1200 |
| 17 | 1460 | 790 | 1 | 2190 | 1520 | 0 | 1520 | 850 |
| 18 | 1056 | 884 | 0 | 884 | 712 | 0 | 712 | 540 |
| 19 | | | | | | | | |
| 20 | 1840 | 960 | 1 | 2760 | 1880 | 0 | 1880 | 1000 |
| 21 | 1840 | 960 | 1 | 2760 | 1880 | 0 | 1880 | 1000 |
| 22 | | | | | | | | |
| 23 | 7960 | 4440 | 0 | 4440 | 920 | 1 | 8420 | 4900 |
| 24 | 7000 | 6750 | 0 | 6750 | 6500 | 0 | 6500 | 6250 |

FIG. 6B

Standard Parts
Multiple Line Feed
Replenishment Matrix

| | Z | AA | AB | AC | AD | AE | AF | AG |
|---|---|---|---|---|---|---|---|---|
| 1 | Wednesday AM Order Qty | Wednesday PM BOH | Wednesday PM Safety Stock @ end of Shift | Wednesday PM Order Qty | Thursday AM BOH | Thursday AM Safety Stock @ end of Shift | Thursday AM Order Qty | Thursday PM BOH |
| 2 | for Wed PM | | | for Thurs AM | | | for Thurs PM | |
| 3 | | | | | | | | |
| 4 | 1 | 2800 | 2360 | 0 | 2360 | 1920 | 0 | 1920 |
| 5 | 1 | 3400 | 2080 | 0 | 2080 | 760 | 1 | 3260 |
| 6 | 1 | 3700 | 1940 | 1 | 4440 | 2680 | 0 | 2680 |
| 7 | 0 | 680 | 316 | 1 | 2816 | 2452 | 0 | 2452 |
| 8 | 0 | 2000 | 1900 | 0 | 1900 | 1800 | 0 | 1800 |
| 9 | | | | | | | | |
| 10 | 0 | 1250 | 600 | 1 | 2100 | 1450 | 0 | 1450 |
| 11 | 0 | 875 | 750 | 0 | 750 | 625 | 0 | 625 |
| 12 | 0 | 800 | 360 | 1 | 1860 | 1420 | 0 | 1420 |
| 13 | 0 | 3200 | 1440 | 2 | 4440 | 2680 | 0 | 2680 |
| 14 | 0 | 1600 | 720 | 1 | 2220 | 1340 | 0 | 1340 |
| 15 | | | | | | | | |
| 16 | 0 | 1200 | 320 | 1 | 1720 | 840 | 1 | 2240 |
| 17 | 0 | 850 | 180 | 1 | 1580 | 910 | 0 | 910 |
| 18 | 0 | 540 | 368 | 0 | 368 | 196 | 1 | 1596 |
| 19 | | | | | | | | |
| 20 | 1 | 2800 | 1920 | 0 | 1920 | 1040 | 1 | 2840 |
| 21 | 1 | 2800 | 1920 | 0 | 1920 | 1040 | 1 | 2840 |
| 22 | | | | | | | | |
| 23 | 0 | 4900 | 1380 | 1 | 8880 | 5360 | 0 | 5360 |
| 24 | 0 | 6250 | 6000 | 0 | 6000 | 5750 | 0 | 5750 |

FIG. 6C

Standard Parts
Multiple Line Feed
Replenishment Matrix

| | AH | AI | AJ | AK | AL | AM | AN | AO | AP |
|---|---|---|---|---|---|---|---|---|---|
| 1 | Thursday PM Safety Stock @ end of Shift | Thursday PM Order Qty | Friday AM BOH | Friday AM Safety Stock @ end of Shift | Friday AM Order Qty | Friday PM BOH | Friday PM Safety Stock @ end of Shift | Friday PM Order Qty | Monday AM BOH |
| 2 | | for Fri AM | | | for Fri PM | | | for Mon AM | Nxt Wks Col L |
| 3 | | | | | | | | | |
| 4 | 1480 | 0 | 1480 | 1040 | 0 | 1040 | 600 | 0 | 600 |
| 5 | 1940 | 0 | 1940 | 620 | 1 | 3120 | 1800 | 0 | 1800 |
| 6 | 920 | 1 | 3420 | 1660 | 1 | 4160 | 2400 | 0 | 2400 |
| 7 | 2088 | 0 | 2088 | 1724 | 0 | 1724 | 1360 | 0 | 1360 |
| 8 | 1700 | 0 | 1700 | 1600 | 0 | 1600 | 1500 | 0 | 1500 |
| 9 | | | | | | | | | |
| 10 | 800 | 1 | 2300 | 1650 | 0 | 1650 | 1000 | 0 | 1000 |
| 11 | 500 | 0 | 500 | 375 | 0 | 375 | 250 | 0 | 250 |
| 12 | 980 | 0 | 980 | 540 | 1 | 2040 | 1600 | 0 | 1600 |
| 13 | 920 | 2 | 3920 | 2160 | 2 | 5160 | 3400 | 0 | 3400 |
| 14 | 460 | 1 | 1960 | 1080 | 1 | 2580 | 1700 | 0 | 1700 |
| 15 | | | | | | | | | |
| 16 | 1360 | 0 | 1360 | 480 | 1 | 1880 | 1000 | 1 | 2400 |
| 17 | 240 | 1 | 1640 | 970 | 0 | 970 | 300 | 1 | 1700 |
| 18 | 1424 | 0 | 1424 | 1252 | 0 | 1252 | 1080 | 0 | 1080 |
| 19 | | | | | | | | | |
| 20 | 1960 | 0 | 1960 | 1080 | 1 | 2880 | 2000 | 0 | 2000 |
| 21 | 1960 | 0 | 1960 | 1080 | 1 | 2880 | 2000 | 0 | 2000 |
| 22 | | | | | | | | | |
| 23 | 1840 | 1 | 9340 | 5820 | 0 | 5820 | 2300 | 1 | 9800 |
| 24 | 5500 | 0 | 5500 | 5250 | 0 | 5250 | 5000 | 0 | 5000 |

FIG. 6D

SPMS PROCESS OVERVIEW

STEP 1: Metering Warehouse Shuttle Delivery to Plant

- All Standard Part shuttles delivered to the LCL Dock
- Delivery Times:
  - $1^{st}$ Shift
  - $2^{nd}$ Shift
- Standard Parts delivered on returnable pallets

— 71

STEP 2: Warehouse Tug Routes

- Route #1: EE 46 / CC 45 / DD 37 / BB 29 / BB 33 / G 24 / F 23 / CC 16
- Route #2: J 49 / J 48 / J 47 / J 46 / G 45 / K 44 / D 44
- Route #3: M 49 / M 46 / M 44 / M 40 / M 38 / F 32 / M 27 / M 24
- Route #4: E 42 / B 42 / D 41 / G 39 / F 38 / E 37 / H 36 / G 35
- Route #5: N 37 / N 34 / N 7

— 72

STEP 3: Workstation Drop Zone Delivery

- MP&L Tug Driver drops tug wheels at line feed location
- Hi/Lo Driver places SPMS Pallet on Drop Zone Pedestal
- Hi/Lo Driver stacks empty SPMS pallets in designated collection area
- MP&L Tug runs an Empty Pallet Collection Route and returns pallets to designated LCL marshaling area

— 73

STEP 4: Workstation Line Feed Replenishment

- Pick List attached to Drop Zone Pallet identifies part & quantity data
- Each box is labeled with SPMS Label - Drop Zone & Shift specific
- All Drop Zone Pallets Off Loaded/Empty by the end of shift

STANDARD PARTS METERING SYSTEM

FIELD OF THE INVENTION

The present invention pertains generally to shipping, logistics and control of production processes which involve the shipping, receiving and assembly of numerous parts in production or mass-assembly operations.

BACKGROUND OF THE INVENTION

In the continuous production of complex products, such as automobiles, which require thousands of parts, including many relatively small parts such as fasteners, the timing of the delivery of such parts to the site of assembly is critical to process efficiency. A shortage of even the smallest part can stop a large assembly line at a cost of thousands of dollars per minute. On the other hand, an excess of parts is burdensome to the production facility, where many boxes of small or "standard" parts are accumulated and stored on racks throughout a factory and along side the production lines. This results in disorganized warehousing of parts in the production facility, which interferes with open working space and line-of-sight production management. Also, inventory control of small parts is much more difficult when excess quantities are present.

"Just-in-time" production processes have been applied successfully with respect to relatively large components such as automobile engines and body parts, so that such parts do not have to be held or warehoused prior to assembly. Application of a similar concept to relatively smaller or "standard" parts, i.e., to regulate the flow of such parts into the production assembly according to the rate of production or real time demand, is more difficult due to the wide variety and number of such parts, and the rapid rate at which they are used. Some cross-docking operations have been developed which break bulk quantities of small or standard parts into smaller lots which are delivered to a plant at a rate which approximates production. However, this type of approach does not address the distribution of the parts within the factory, or according to line feed workstations. Nor do such systems monitor part usage per workstation or bay, to provide a running real-time inventory of small parts. Also, the prior art has not adequately addressed the coordination of delivery of a large number of relatively small "standard" parts from diverse points in timing with production/mass assembly operations.

SUMMARY OF THE PRESENT INVENTION

The present invention provides a complete system for the transport, warehousing, distribution and assembly line workstation placement of small or standard parts used in an assembly operation. As used herein with reference to the invention, the name "standard parts" refers generally to relatively small parts which are boxed in quantity for shipment, and which are used in relatively large quantities. Certain non-limiting examples of standard parts are fasteners, such as pop rivets, screws, bolt-nut combinations, plastic ties, adhesive products and other small functional parts. Standard parts are typically boxed in mass quantities such as 100 to 1000 or more in relatively small boxes, such as boxes of approximately one cubic foot or less. In accordance with the invention, standard parts are warehoused in boxed shipments according to routes by which the boxed parts will be distributed within an assembly plant. As used herein with reference to the invention, the term "plant" refers to any production or assembly facility where parts are delivered and assembled into subassemblies or finished products.

The Standard Parts Metering System is a type of internal logistics for logical movement of parts within a plant or assembly station. The system defines material flow procedures based upon per shift quantity requirements, to eliminate on-site parts inventory and provide immediate misuse or over-shipment notification.

Standard Parts Metering is the metering of relatively small or standard parts to an assembly point in shift production quantities (by the box instead of by the pallet)—stabilizing the flow of parts into the production/assembly point. Standard Parts Metering also includes operator initiated replenishment with sequenced deliveries to pedestal production drop zones. The system provides the advantages of:

Optimized delivery of standard parts based on production usage requirements (no over/under shipments);

decreased volume of standard parts quantities at consolidation pool operations; reduced transit times—equating to reduction in inventory carrying costs;

elimination of on-site inventories—fulfilling line-of-site management requirements; gained process control—greatly reducing expediting costs;

disciplined storage and metering procedures (sequencing);

clearly identified Production Drop Zone locations and Material Handling routes;

pedestal linefeed locations within drop zones—reducing "sprains and strains" claims;

line operator replenishment based on actual usage;

limited and controlled amount of linefeed storage;

utilization of returnable containers (closed loop cycles);

immediate notification of part misuse (supplier over-ship or linefeed loss);

conformance with parameters of management of external and internal logistics;

weekly release data to forecast and build optimized transportation routes;

utilization of truck load or LTL logistics to implement milkrun transportation efficiencies;

establishment of regional domiciles to significantly reduce transit times and inventory levels;

sequenced truckload deliveries to point-of-use docks according to production drop zone locations;

time window deliveries coordinated by a Lead Logistic Provider;

linefeed operators requesting replenishment prior to the end of their shift;

linefeed pedestals utilized with returnable containers for ergonomic efficiencies;

immediate notification of part misuse issues so corrective actions can be taken (change in system quantities or corrective processes for misuse);

improvement of efficiency within a manufacturing plant by:
  level material flow to the plant (reduced inventory carrying costs);
  transportation budget efficiencies (particularly expedite costs);
  time window deliveries;
  sequenced linefeed deliveries;
  immediate replenishment under exception fulfillment requirements (near elimination of stock outages with proximity of metering warehouse and safety stock inventories);

hourly employee participation in the Metering process;
increased plant space availability (value add for Greening parameters, i.e., marshaling areas for returnable containers);
manpower allocation efficiencies based on instituting line of site management;
material Handling manpower reductions (overtime requirements—weekends);
monitor/manage release data;
build optimal transportation routes;
track and exception manage LTD (load to delivery);
arrive Standard Parts into WMS (warehouse management system);
maximize inventory levels based on WMS data;
pick and pack according to production drop zone specifications;
sequence load shuttle deliveries;
follow lead logistics provider requirements for time window deliveries opportunities;
become information partners with lead logistics provider;
immediately identify and notify parts misuse (over-ship or line feed loss); and
recommend inventory float reductions to material handling.

These and other aspects of the invention are herein described in detail as follows:

BRIEF DESCRIPTION OF THE FIGURES

The accompanying drawings incorporated in and forming a part of the specification, illustrate several aspects of the present invention, and together with the description server to explain the principles of the invention. In the drawings:

FIG. 3 is a tabular correlation of route numbers to drop zones;

FIG. 5 is a spreadsheet example of identifying part numbers with drop zones;

FIGS. 6A–6D are examples of a multiple line feed replenishment matrix continuously monitored and updated throughout a production week; and FIG. 7 is an alternate summary block diagram representation of a standard parts metering system.

These and additional embodiments of the invention may now be better understood by turning to the following detailed description wherein an illustrated embodiment is described.

DETAILED DESCRIPTION OF PREFERRED AND ALTERNATE EMBODIMENTS

The Standard Parts Metering System (also referred to herein as "SPMS") is a method and process for managing the flow of standard parts into an assembly facility, such as an automobile factory, which eliminates the need to stock standard parts within the facility, and reduces or eliminates loss of standard parts inventory, and reduces shipping costs associated with standard parts. Standard parts are received in a staging or metering warehouse where they are arranged according to a delivery route into a plant. Standard parts are delivered to the plant in the minimum boxed quantities according to the amount needed for the next production shift or cycle. Within the plant, specific drop zones are created to supply one or more line feed workstations with standard parts. As used herein, the name "line feed workstation" (or simply "workstation") refers a point at which a worker assembles or attaches standard parts to the product. Workstations are associated with an assembly line, or are discrete stations in a progressive stage assembly operation. A standard parts pedestal is provided at each drop zone. The standard parts pedestal is, in a preferred embodiment, a support platform such as table of an appropriate size to accommodate a standard parts supply for the associated workstations for one production shift. In one non-limiting example, a standard parts pedestal (or simply "pedestal") is a platform with approximately sixteen to twenty square feet of surface area, elevated two to four feet off the floor. In the method of the invention, a sufficient supply of standard parts for one or more workstations for a production shift is stocked on a single pedestal. Ideally, There is no stock or inventory of standard parts within the production facility other than as present at the standard parts pedestal.

Figure 1:
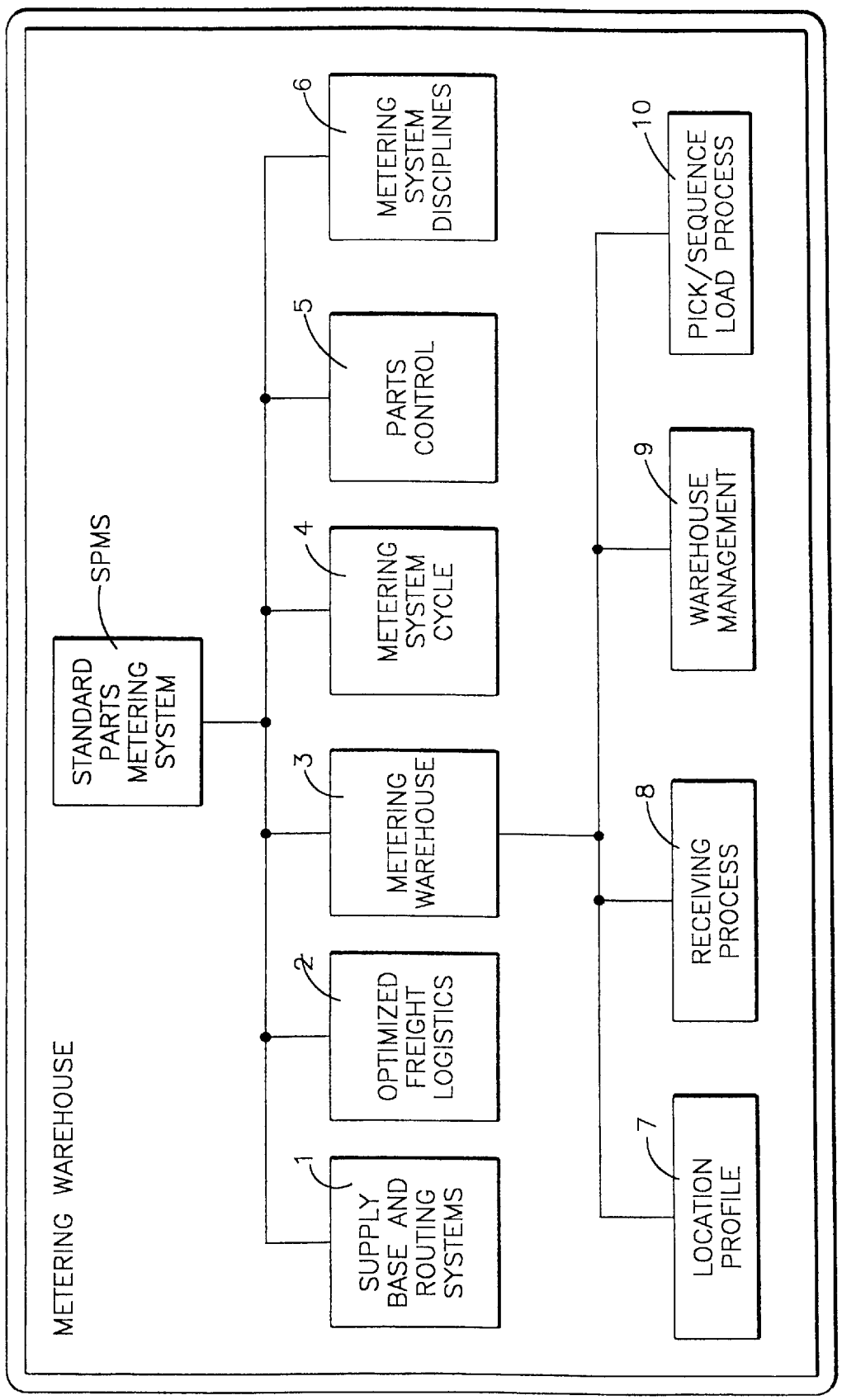
FIG. 1 is block diagram representation of a standard parts metering system.

The SPMS includes six primary functions, as shown in the block diagram of FIG. 1, including:

1. Supply Base & Routing Systems,
2. Optimized Freight Logistics,
3. Metering Warehouse,
4. Metering System Cycle,
5. Parts Control, and
6. Metering System Disciplines.

In blocks 1 and 2, management of external logistics, i.e., the movement of parts external to a plant or point of assembly, is accomplished by creating an optimal logistics network that will result in the shipment of materials more frequently, in smaller quantities and deliver materials at specified times. To manage external logistics requires a disciplined transportation network of the standard part DDL supply base that optimizes conveyance routes to a local metering standard parts warehouse, to improve transit floats, inventory levels and expedite costs. For example, the wide variety of standard parts used in the assembly of automobiles, and the large number of standard parts suppliers, requires shipping from a large number of diverse places to the assembly plant. Rather than each standard parts supplier make their shipments separately and directly to the plant, it is more efficient to have a much smaller number of "milk runs" of a single truck picking up from several suppliers, and deliver to a standard parts metering warehouse. This can be arranged because of the relatively small size of standard parts. The use of a single pickup route in place of multiple deliveries, in support of an assembly operation which consumes millions of standard parts provides a significant cost savings. The use of the standard parts warehouse further facilitates this system because it can accommodate the arrival of combined shipments of standard parts independent of on-going assembly operations.

In a further aspect of the invention, a standard parts metering warehouse (block 3) is provided in which standard parts are received from the multiple supplier pickup runs, and arranged according to drop-off or delivery route in which the standard parts will be delivered or "metered" to workstations in the assembly plant.

The standard parts metering warehouse utilizes a warehouse management system which is programmed to stock and control the warehouse according to a metered delivery schedule (block 4). The metered delivery schedule is determined by the production schedule of a production facility or assembly plant. Received shipments of standard parts are broken down by part number and quantities verified. The shipments can be matched against orders placed through the assembler's computer system, and any discrepancies noted therein. The standard parts metering warehouse includes the elements of a location profile (block 7), receiving process (block 8), warehouse management (block 9) and pick/ sequence load process (block 10). The location profile is preferably close to the assembly plant, both for quick delivery of regularly scheduled shipments, and for "hot loads" to cover unexpected part shortages. The broken down loads of standard parts are delivered to the assembly plant by shuttle delivery trucks.

In the receiving process, a bill of lading is checked to verify the trailer number and number of pallets. A master packing slip, indicating the parts to be received, is produced. The pallets are broken down by part number and quantities verified against the master packing list. Any discrepancies are noted. If the shipment is in conformance with the master packing slip, it is booked for payment. The standard parts are placed in the warehouse in pre-established stock locations which are related to drop zones within the assembly plant. As further explained, one or more pedestals is associated with each drop zone.

Figure 2:
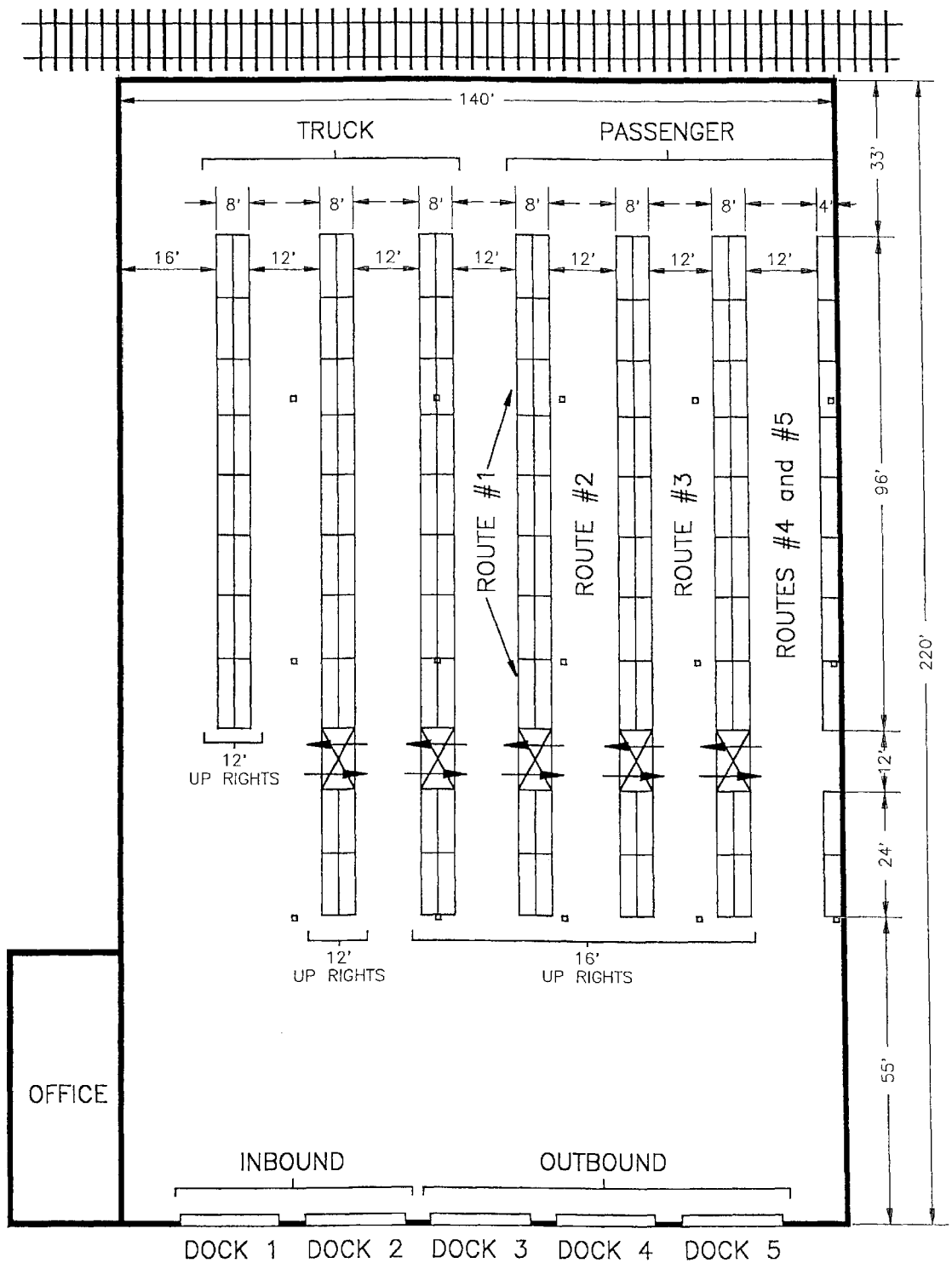
FIG. 2 is an example of representative routes in a warehouse.

When the standard parts pallets are broken down, the boxes are re-labeled in accordance with the invention, with a label which includes both the part number or other identifying information, and a drop zone designator, which corresponds to a physical location within the plant (block 5). Thus a correlation is established between the type of standard part, and the location within an assembly plant where the part is used, i.e., attached to an end product such as an automobile. The standard parts boxes are then stocked within the metering warehouse according to the drop zone locations and, more specifically, according to a most efficient delivery route to the drop zone locations, or in other words, according to a sequence of corresponding drop zone locations in an optimized intra-plant delivery route. This minimizes the amount of running around inside the plant in order to stock each of the assembly workstations with standard parts. FIG. 2 shows a representative routes #1–#5 corresponding to drop zones within a plant which are preferably in some proximate or sequential arrangement which minimizes travel and delivery time.

Figure 4A:
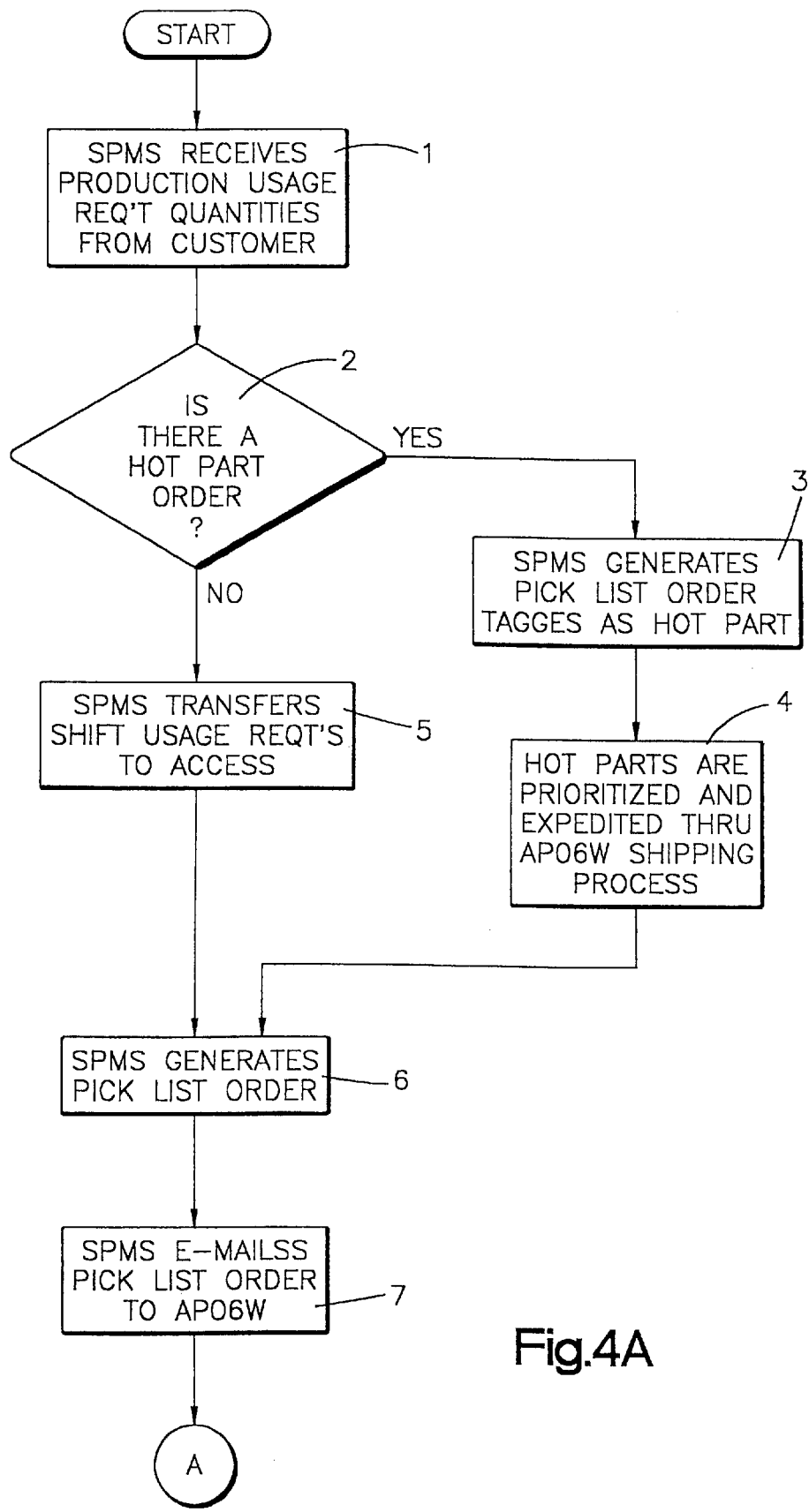
FIGS. 4A–4D is a flow chart representing the present invention from shipping process to assembly plant.
Figures 4B, 4C:
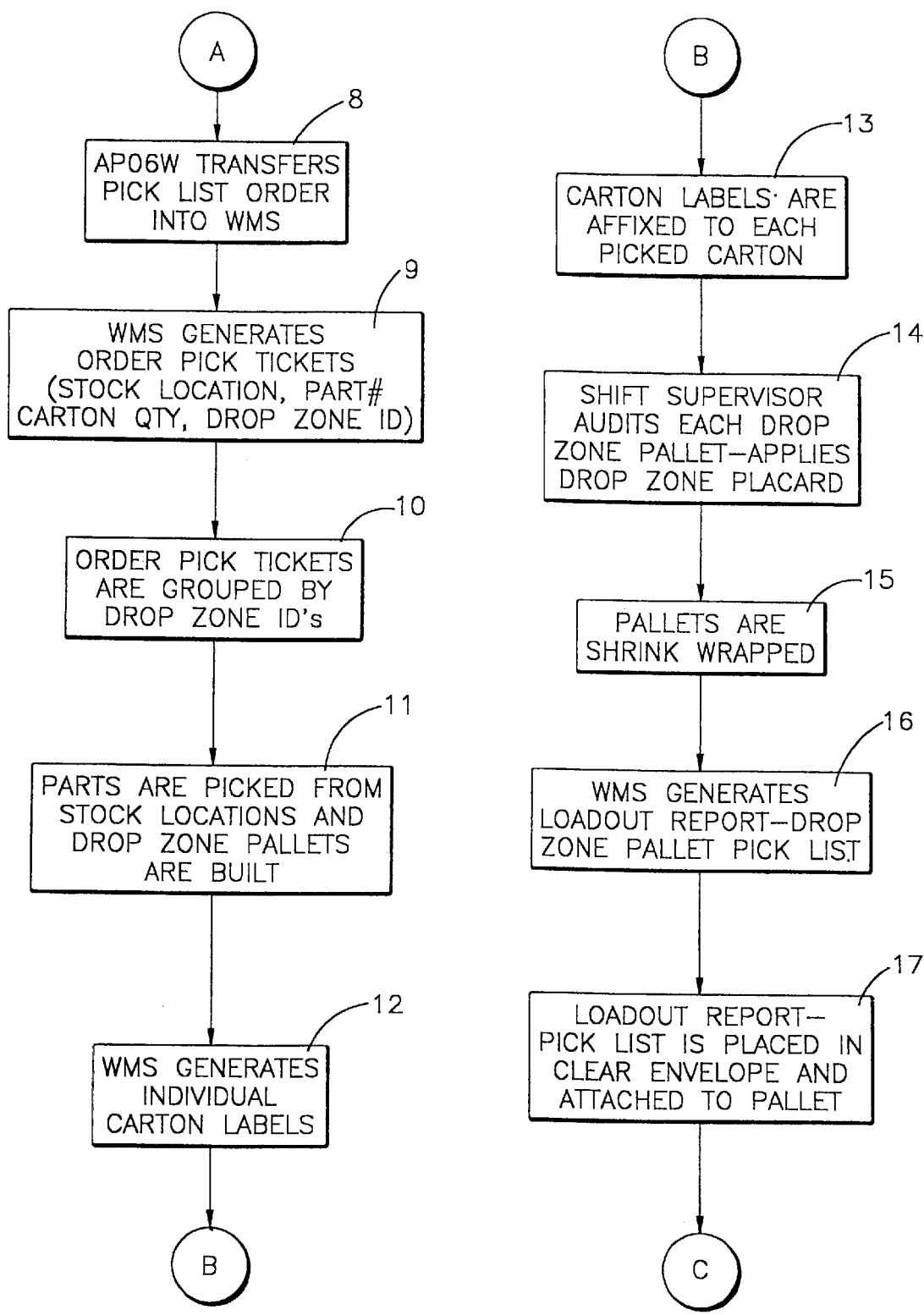
Figure 4D:
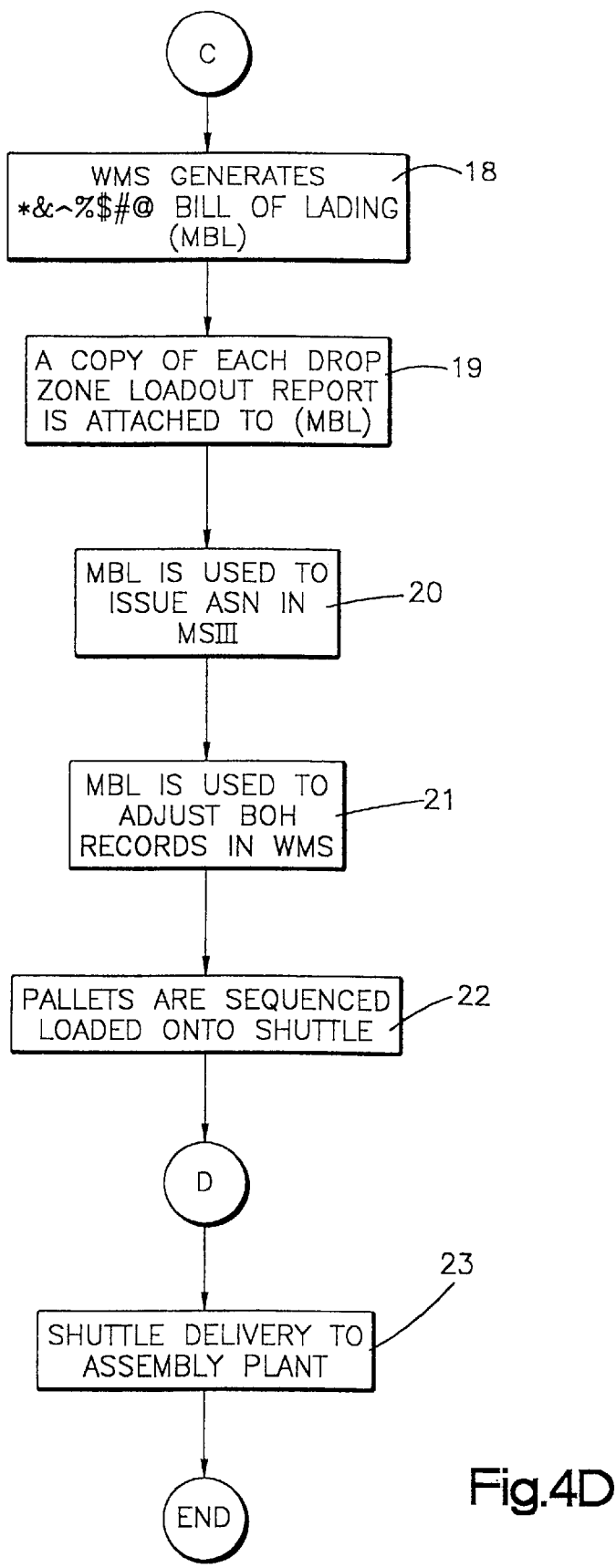

FIG. 4 sets forth steps in the SPMS shipping process from the metering warehouse to an assembly plant. Using a programmed WMS, a pick list and master bill of lading (MBL) is generated, and a standard parts shipment assembled for delivery to the assembly plant. The SPMS is production driven, so that only a specified quantity of standard parts required for a single production shift are delivered to the plant. Extra stock is preferably held at the metering warehouse, to reduce or eliminate inventory at the factory, and be available in the event of shortages during a production shift.

In step 1 the system receives production use requirement quantities for each drop zone or work station within the assembly plant for each standard part. At step 2 there is a check for any "hot part" orders, which may occur as there is an anticipated shortage of a particular part. If yes, at step 3 the system generates a pick list for the hot part and at step 4, delivery of the hot part to the corresponding drop zone or workstation is accomplished by proceeding to step 6. At step 5, the system transfers the standard parts production shift usage data to the warehouse management system database to generate a pick list order at step 6. At step 7, the pick list order is forwarded or communicated to the metering warehouse operations. At steps 8 and 9, the warehouse management system receives the pick list order and generates an order pick tickets denoting standard part stock location, part numbers, part and quantities and drop zone ID. At step 10, the order pick tickets are picked by drop zone IDs. At step 11, parts are picked from the stock location within the metering warehouse and drop zone pallets are assembled for delivery to the assembly plant. At step 12, the warehouse management system generates individual carton labels which are affixed to the standard parts cartons at step 13. An audit of the assembled shipment is conducted at step 14 when and the pallets shrink wrapped at step 15. A load out report is generated at step 16 which includes the drop zone pallet pick list, which is attached to the pallet at step 17. A master bill of lading (MBL) for the shipment is generated at step 18 and a copy of each drop zone load out report attached to the MBL at step 19. At step 20, the MBL is used to issue an ASN in an information management system. An ASN or a unique identifier in an information management system tied to the assembly operation. At step 21, the MBL is used to adjust BOH records in the warehouse management system. At step 22, the pallets are sequenced loaded onto a shuttle for delivery to the assembly plant at step 23.

Another important aspect of the SPMS is that through the standard parts warehousing and metered delivery processes, very accurate information is available on quantities and locations of standard parts in the plant at all time. Return tracking of parts not used in a production shift can be made upon each subsequent delivery to the drop zone pedestals. This information can be used to constantly adjust subsequent shipments from shift to shift, to avoid overstock within the plant, or repeated part shortages which requires costly expedited shipping.

With standard parts delivered in sequence to drop zone pedestals per shift, a metering system cycle is established. As shown for example by FIG. 5, a spreadsheet identifying part numbers with corresponding drop zones provides a quick summary of the running inventory/usage of standard parts within a plant. Further detailed information on the in-plant inventory, such as number of cartons or boxes at a drop zone, and daily consumption are also provided. Column 51 lists the different standard parts numbers. Column 52 designates the corresponding drop zones. Column 53 designates the mlf (multiple line feed) number. Column 54 is for notes on the installation site or for the part. Column 55 lists an optional standard part which can be substituted if necessary. Column 56 lists the number of parts per unit. Column 57 lists a total daily usage for each part.

The SPMS also includes a multiple line feed (mlf) process which tracks and monitors standard parts usage at drop zones where variations in the assembly operation will change the standard parts consumption rate. For example, a car to be built with a four cylinder engine will use a different number of standard parts than a car to be built with a six cylinder engine. This can result in shortage or excess of standard parts at any given workstation. However, through information on the proposed production during a shift, the variation in the number of standard parts required at any given drop zone for a shift, and the running "inventory" of standard parts at the drop zone pedestals throughout the plant, adjustments to the standard parts shipments can be made to match production, and thereby eliminate the costs of over- or under-stock of standard parts.

FIG. 6 shows a representative multiple line feed replenishment matrix correlating drop zones to standard part numbers, vehicles types, cross-reference part numbers, and daily and shift production scheduled usage. As further illustrated in FIGS. 6A–6D, this information can then be continuously monitored and updated throughout a production week to keep an accurate running account of standard parts. In FIG. 6, Column A lists a specific drop zone I.D. for each workstation in an assembly plant. In Column B, a line feed I.D. can be denoted, to identify the production line to which the Drop Zone corresponds. Column C is for the standard part numbers. Column D identifies the end product to which the standard parts are attached, such as 'vehicle type'. Column E is the per unit pull amount. Column F is for a cross-reference part number, which may be a substitute part or a corresponding part. Column G lists part usage for a daily production schedule. Column H lists part usage for shift production schedule.

In FIG. 6A, column I lists shift usage requirement. Column J is a predictable quantity adjustment amount. Column K is a minimum pack quantity. Columns L–Q are running quantities for each of the shifts for an entire day, such as Monday, including Monday AM BOH (column L); Monday AM safety stock at end of shift (column M); order quantity (column N); Monday PM BOH (the total of (N·K)+M); Monday PM safety stock at end of shift (column P); and Monday PM order quantity (column Q). A similar standard parts tracking and metering production days of the week, Tuesday–Friday, as set forth in the representative respective tables 6B (columns R–Y), 6C (columns Z–AG) and 6D (columns AH–AP).

The drop zone delivery aspect of the metering cycle (metered delivery of standard parts to the plant) includes the basic elements of:

giving the shuttle load data to the deliverer;
establishing a time window delivery schedule, which may include point-of-use unload dock destinations, and accommodation for returnable containers;
unloading at the plant according to the delivery schedule;
sequence loading returnable containers (e.g., pallets) at specified docks;
empty returnable containers marshaled at the docks for reload;
return to the metering warehouse;
follow material flow route within metering warehouse;
stop at each production drop zone location according to drop zone tags on returnable containers;
fill returnable containers placed on pedestals;
return to dock to have empty containers off-loaded;
place racks in pre-assigned marshaling area.

FIG. 7 sets forth an alternate summary of the process.

Step 1 (box 71) covers shuttle delivery of standard parts to the assembly plant, or returnable pallets, according to predetermined delivery times for each shift. Step 2 (box 72) covers metering warehouse tug routes predetermined according to assembly plant workstation sequences. Step 3 (box 73) covers workstation drop zone delivery, where the actual delivery of individual standard parts containers to the workstations pedestals is accomplished by stopping the tug wheels at a designated line feed location or marker. A Hi/Lo then removes the standard parts pallet from the tug and places it on the drop zone pedestal. Empty pallets are placed at a designed collection area, to be picked up in a pallet collection run by the tug on return to the metering warehouse. Step 4 (box 74) covers workstation line feed replenishment, where a pick list, identifying part and quantity data, is attached to a drop zone pallet, labeling of standard parts boxes (drop zone and shift specific data); and all drop zone pallets are off-loaded or emptied by the end of each shift.

As previously described, each standard part box delivered from the metering warehouse to the plant includes a label which identifies the part number, drop zone I.D., order number and line feed I.D. The metering warehouse needs only the part number and drop zone location to make any additional shipments of standard parts which may be required. Because the SPMS inevitably identifies part shortages, the situation can be investigated to make appropriate production changes. For example, engineering specification might call for only two fasteners for a particular part, which in reality requires three or more. Changes to engineering or production processes can thus be made from information provided by the SPMS. This is a function of the standard parts control aspect of the invention.

Parts control may also extend back to suppliers by monitoring the standard parts metering warehouse inventory. Chronic shortages of parts can be identified and a back order report generated. Similarly, repeated "hot rush" calls from the production line workers will identify certain parts which should be inventoried at higher levels. A hot rush expedited shipping process can be integrated through the metered delivery process through the use of air freight and special runners, without otherwise disrupting operation of the SPMS. Importantly, because the location and quantity of all standard parts in a plant is known through the SPMS, an out-of-stock situation can be covered by "borrowing" the same standard parts stock from another drop zone which may have a temporary supply.

The invention thus provides a system and method for metered delivery of standard parts to a production facility, and for accurate real-time accounting of standard parts inventories. By breaking down standard parts according to production cycle specific quantities and workstation locations, substantial efficiencies in parts control and inventory management are achieved. The use of a metering warehouse in accordance with the system fully exploits the logistical advantages of consolidated shipments from standard parts manufacturers. In a preferred embodiment, close proximity of the metering warehouse to the production facility enables the production facility to operate with as little as per-shift standard parts stock, resulting in substantial space savings within the factory, and a safer more productive working environment.

What is claimed is:

1. A system for controlling the shipment and warehousing of standard parts, and for providing metered delivery of standard parts to an assembly plant according to a production schedule, the system having:

a route for collection of standard parts from a plurality of standard parts suppliers;
a standard parts metering warehouse for receiving standard parts from a plurality of standard parts suppliers;
a labeling scheme for standard parts containers which identifies a type of standard part and an associated drop zone;
an assembly plant drop zone route for distributing standard parts throughout an assembly plant, each drop zone corresponding to a physical location within an assembly plant and to a particular type or types of standard parts, each drop zone being affiliated with one or more workstations along an assembly line; and
wherein standard parts are packaged in production shift quantities and stocked in the metering warehouse according to designated drop zones in the assembly plant.

2. The system of claim 1 further comprising a metering warehouse standard parts pick and load route by which standard parts are collected for delivery to an assembly plant, wherein the pick-up route corresponds to the drop zone route in the assembly plant.

3. The system of claim 1 further comprising a metering cycle set by a production schedule of the assembly plant, whereby standard parts are delivered to the assembly plant according to the metering cycle.

4. The system of claim 1 wherein standard parts inventories at workstations in the assembly plant are accounted for at the end of each production shift.

5. A system for controlling the shipment and warehousing of standard parts, and for providing metered delivery of standard parts to an assembly plant according to a production schedule, the system having:
- a route for collection of standard parts from a plurality of standard parts suppliers;
- a standard parts metering warehouse for receiving standard parts from a plurality of standard parts suppliers;
- a labeling scheme for standard parts containers which identifies a type of standard part and an associated drop zone;
- an assembly plant drop zone route for distributing standard parts throughout an assembly plant, each drop zone corresponding to a physical location within an assembly plant and to a particular type or types of standard parts, each drop zone being affiliated with one or more workstations along an assembly line; and
- a metering warehouse standard parts pick and load route by which standard parts are collected for delivery to an assembly plant, wherein the pick-up route corresponds to the drop zone route in the assembly plant.

6. A system for controlling the shipment and warehousing of standard parts, and for providing metered delivery of standard parts to an assembly plant according to a production schedule, the system having:
- a route for collection of standard parts from a plurality of standard parts suppliers;
- a standard parts metering warehouse for receiving standard parts from a plurality of standard parts suppliers;
- a labeling scheme for standard parts containers which identifies a type of standard part and an associated drop zone;
- an assembly plant drop zone route for distributing standard parts throughout an assembly plant, each drop zone corresponding to a physical location within an assembly plant and to a particular type or types of standard parts, each drop zone being affiliated with one or more workstations along an assembly line; and
- a metering cycle set by a production schedule of the assembly plant, whereby standard parts are delivered to the assembly plant according to the metering cycle.

7. A system for controlling the shipment and warehousing of standard parts, and for providing metered delivery of standard parts to an assembly plant according to a production schedule, the system having:
- a route for collection of standard parts from a plurality of standard parts suppliers;
- a standard parts metering warehouse for receiving standard parts from a plurality of standard parts suppliers;
- a labeling scheme for standard parts containers which identifies a type of standard part and an associated drop zone;
- an assembly plant drop zone route for distributing standard parts throughout an assembly plant, each drop zone corresponding to a physical location within an assembly plant and to a particular type or types of standard parts, each drop zone being affiliated with one or more workstations along an assembly line; and
- wherein standard parts inventories are taken at workstations in the assembly plant and are accounted for at the end of each production shift.

* * * * *